(12) United States Patent
Tazzari et al.

(10) Patent No.: US 9,906,942 B2
(45) Date of Patent: Feb. 27, 2018

(54) INVERTER AND RENEWABLE ENERGY POWER GENERATION INSTALLATION

(71) Applicant: ABB Schweiz AG, Baden (CH)

(72) Inventors: Davide Tazzari, Loro Ciuffenna (IT); Filippo Vernia, La Spezia (IT); Gabriele Fiacchini, San Giustino Valdarno-Loro Ciuffen (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/383,713

(22) Filed: Dec. 19, 2016

(65) Prior Publication Data

US 2017/0180977 A1    Jun. 22, 2017

(30) Foreign Application Priority Data

Dec. 17, 2015   (EP) .................................. 152009856

(51) Int. Cl.
*H04W 8/18*    (2009.01)
*H04L 29/08*    (2006.01)
*H04W 4/14*    (2009.01)

(52) U.S. Cl.
CPC ............. *H04W 8/183* (2013.01); *H04L 67/34* (2013.01); *H04W 4/14* (2013.01)

(58) Field of Classification Search
CPC ... H04W 8/183; H04W 4/14; H04W 455/558; H04L 67/34
See application file for complete search history.

(56) References Cited

U.S. PATENT DOCUMENTS

| | | | |
|---|---|---|---|
| 2006/0028354 A1* | 2/2006 | Green | G01D 4/004 340/870.02 |
| 2010/0191489 A1* | 7/2010 | Zolot | H02J 3/38 702/62 |
| 2010/0273462 A1* | 10/2010 | Thorn | H04W 8/26 455/414.1 |
| 2013/0123998 A1* | 5/2013 | King | G06F 1/30 700/292 |
| 2014/0129160 A1* | 5/2014 | Tran | H02J 3/14 702/61 |
| 2015/0088442 A1* | 3/2015 | Farrar | G01R 21/1333 702/62 |
| 2015/0269664 A1* | 9/2015 | Davidson | G06Q 40/00 705/35 |
| 2016/0366602 A1* | 12/2016 | Rapp | H04W 24/04 |

* cited by examiner

*Primary Examiner* — David Bilodeau
(74) *Attorney, Agent, or Firm* — Taft Stettinius & Hollister LLP

(57) ABSTRACT

An inverter for renewable energy applications, comprising: a meter; and a cellular card which is operatively connected to said meter and which is adapted to provide a communication with a network of a mobile network operator.

8 Claims, 4 Drawing Sheets

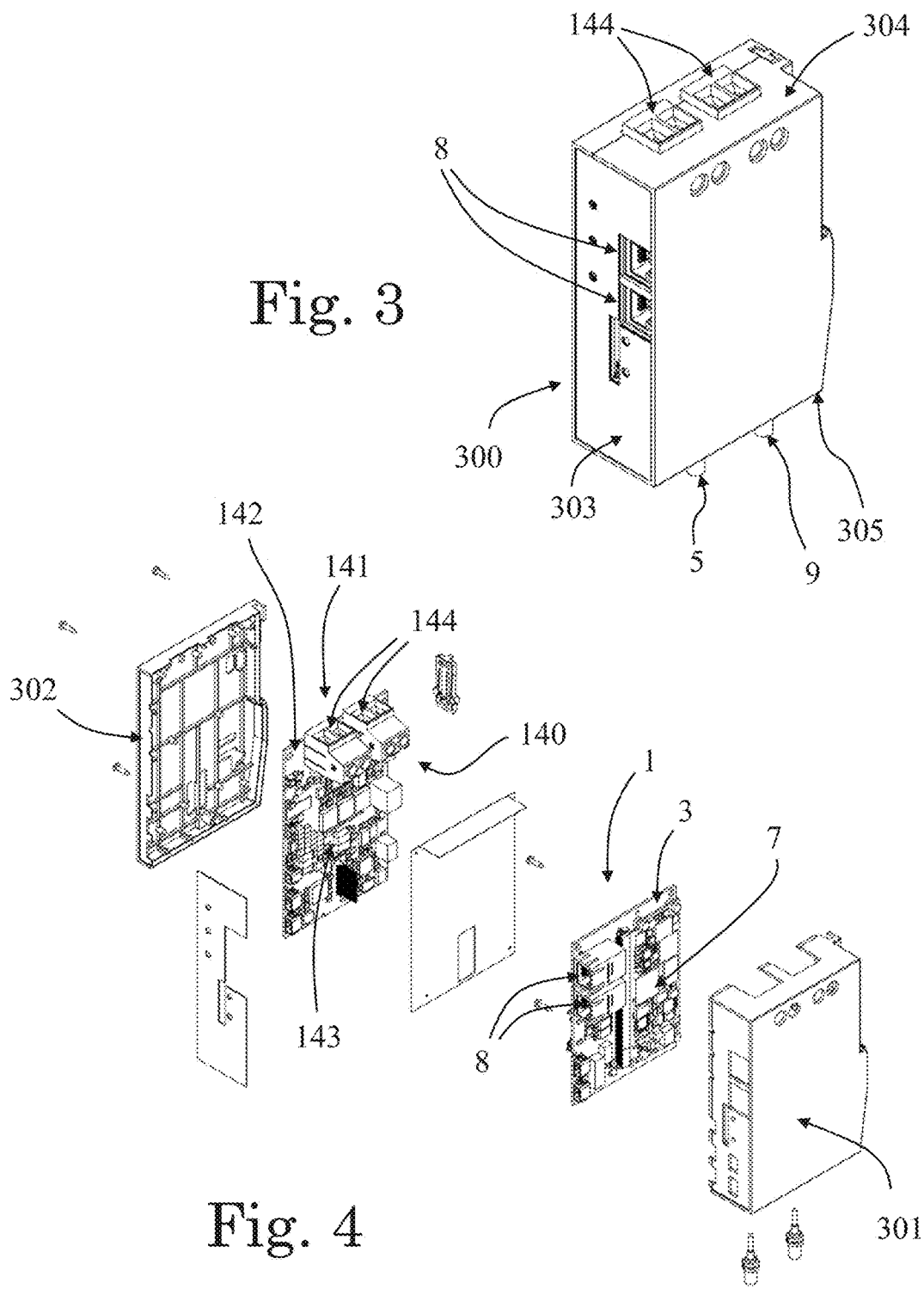

INVERTER AND RENEWABLE ENERGY POWER GENERATION INSTALLATION

The present invention relates to an inverter for renewable energy applications, which is provided at least with a cellular card for establishing a communication to a network of a mobile network operator, and a meter operatively connected to the cellular card.

As well known in the art, inverters are power electronic devices used in renewable energy applications, e.g. solar or wind applications, for performing DC-AC power conversion.

It is further known in the art to operatively associate at least one meter to an inverter, such meter being adapted to carry out at least measurements related to the AC side of the inverter. The inverters and associated electrical meters need to be provided with communication capabilities in order to better manage them, for example for monitoring purposes, e.g. when only one inverter or few inverters are used, for instance in residential applications, and/or for proper coordination, e.g. when there are several inverters operatively associated in complex architectures, such as in solar power plants or wind farms.

For these tasks the inverter and associated meters comprise communication means for establishing a communication to one or more external devices.

This communication means typically comprises wired connections to the external devices, meaning that these devices should be located near to the installation site of the inverters and associated meters.

The communication means can further comprise wireless connections to Wi-Fi private networks, such as Wi-Fi networks of the owners of the inverters. However, especially in the case in that the installation of the inverters and meters is in isolated zones, the coverage of private networks should be weak or even missing.

Although such known solutions allow to properly perform the required functionalities, there is room and need for further improvements.

This need is fulfilled by an inverter for renewable energy applications, the inverter comprising:
- a meter;
- a cellular card which is operatively connected to said meter and which is adapted to provide a communication with a network of a mobile network operator.

Another aspect of the present application is to provide a renewable energy power generation installation comprising at least one inverter as the inverter defined by the annexed claims and disclosed in the following description.

Further characteristics and advantages of the present invention will become better apparent from the description of preferred but not exclusive embodiments of an inverter according to the disclosure, illustrated only by way of non-limitative examples in the accompanying drawings, wherein:

FIG. 1 schematically shows an inverter according to the present invention;

FIG. 2 partially shows an inverter according to the present invention, in which a cover of a connection box of the inverter is removed for showing various elements or components installed therein;

FIG. 3 illustrates a cellular box adapted to be installed in an inverter according to the present invention;

FIG. 4 is an exploded view of the cellular box illustrated in FIG. 3, and of the components housed into such box;

Figure 1:
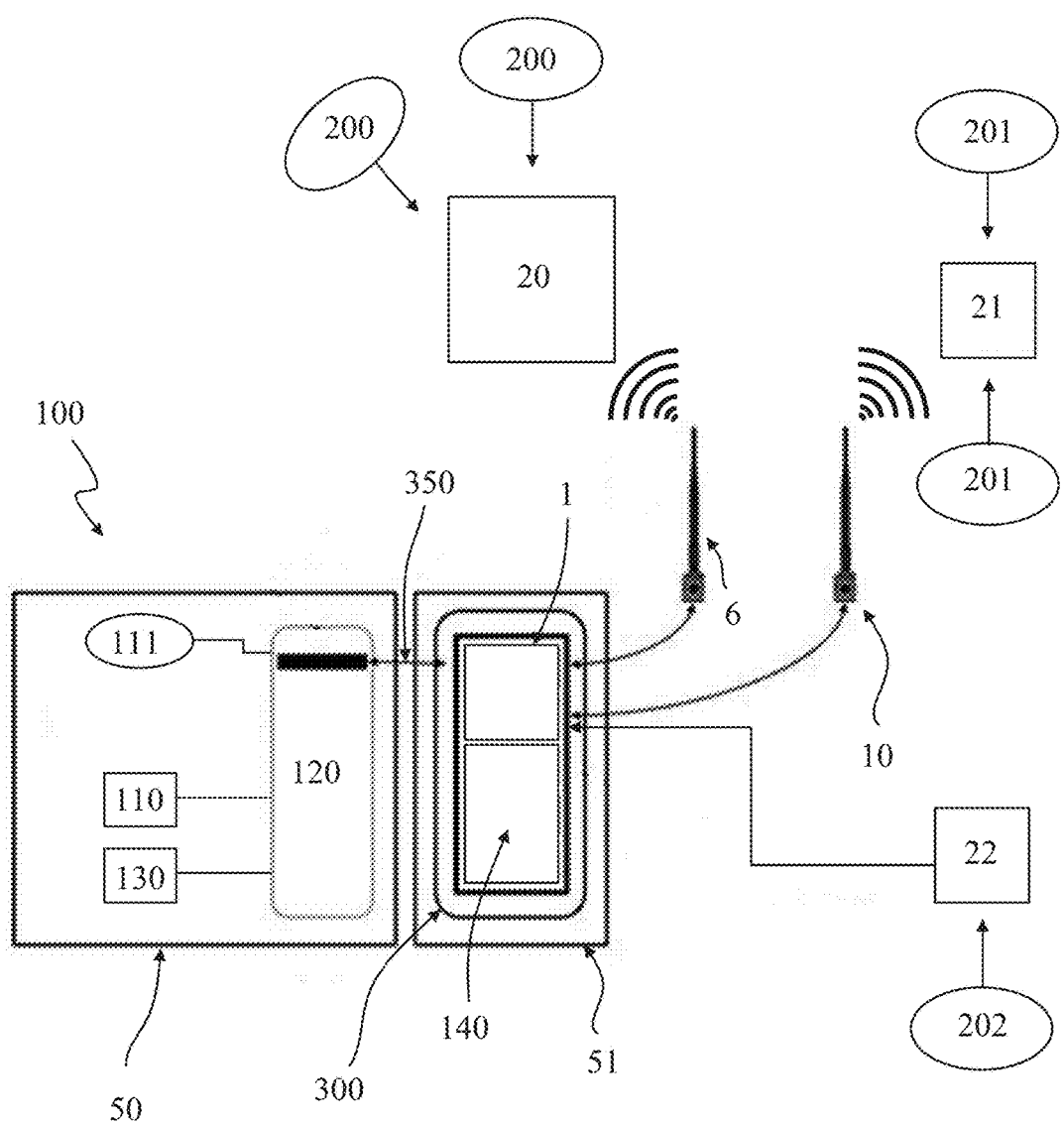

It should be noted that in the detailed description that follows, identical or similar components, either from a structural and/or functional point of view, may have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further when the term "adapted" or "arranged" or "configured" or "shaped", is used herein while referring to any component as a whole, or to any part of a component, or to a whole combinations of components, or even to any part of a combination of components, it has to be understood that it means and encompasses correspondingly either the structure, and/or configuration and/or form and/or positioning of the related component or part thereof, or combinations of components or part thereof, such term refers to.

With reference to the above cited figures, an inverter for renewable energy applications (e.g. solar or wind applications) according to the present disclosure is indicated by the overall reference number 100 and hereinafter it will be referred to as the "inverter 100" for the sake of simplicity.

The inverter 100 comprises power conversion electronic means 110 for the conversion from DC to AC power, and a supervision electronic card 120 operatively associated to the power conversion means 110 for controlling the operation thereof.

The inverter 100 further comprises:
- AC connectors 52 which are adapted to provide the AC power generated by the inverter 100 through the power conversion means 110 to one or more AC loads and/or grids; and
- DC connectors 510 which are adapted to receive DC power generated by power sources.

The DC power received through the DC connectors 510 is inputted, for example through cable connections or other suitable conductive means, to the power conversion means 110 in the first box 50. The power conversion means 110 convert the received DC power to AC power according to the control executed by the supervision card 120. This generated AC power is provided, for example through cable connections or other suitable conductive means, to the AC connectors 52 for the delivery to the electrical loads and/or grids associated to the inverter 100.

For example, the power conversion electronic means 110 comprise a DSP (Digital Signal Processor) board for energy conversion; the supervision board 120 comprises a control circuit which, among its various tasks, is adapted to control the operation of the DSP board. Among the others, the supervision card 120 coordinates and monitors the operations of the DSP board.

Since the realization, functioning and mutual relationship of above disclosed power conversion means 110 and supervision card 120, from an hardware and software point of view, are readily available to a person skilled in the art and not relevant for the scope and understanding of the present invention, they will not be described in particular details.

Figure 2:
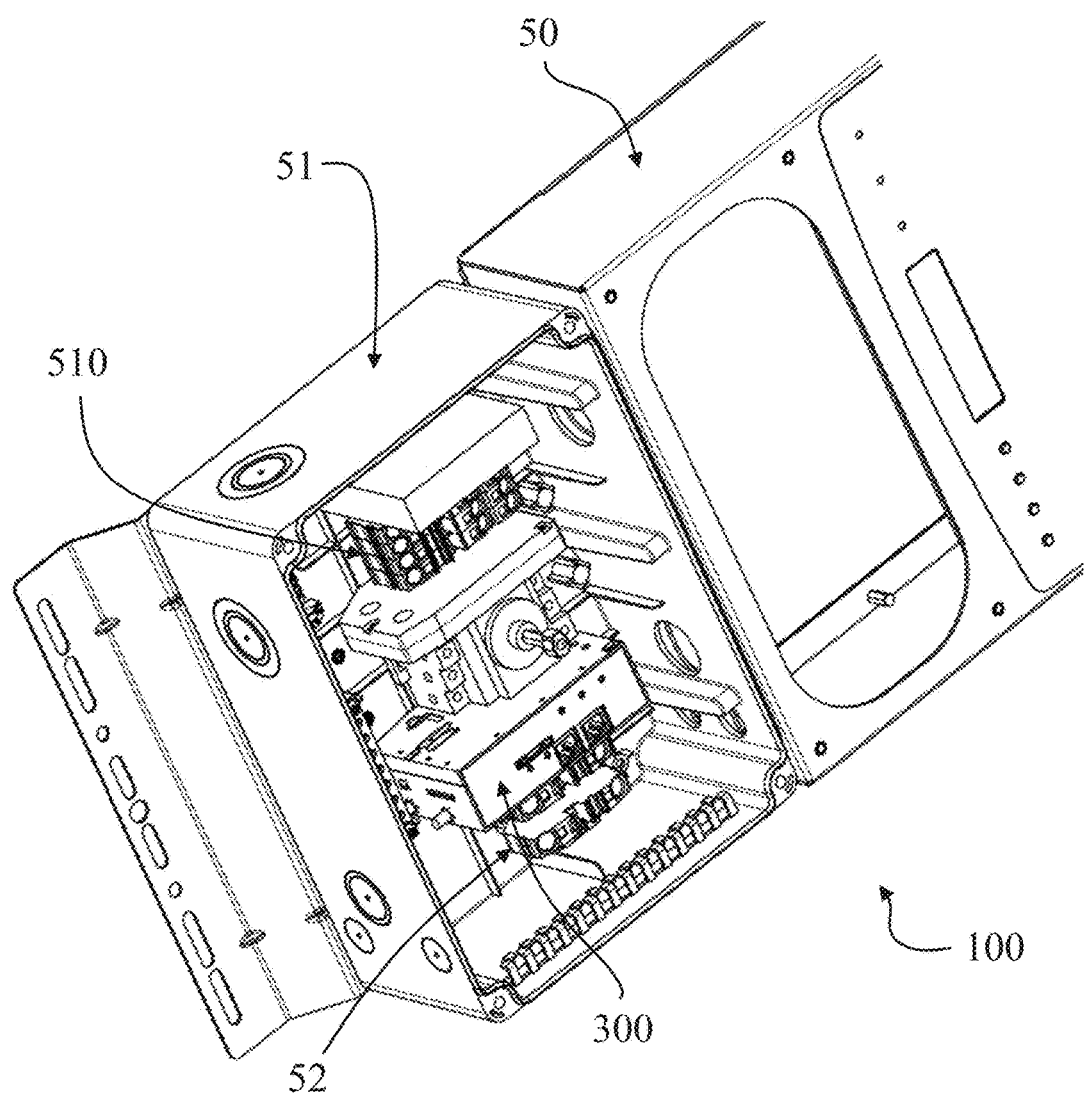

The exemplary inverter 100 illustrated in FIGS. 1 and 2 comprises a first box 50 which houses at least the power conversion electronic means 110 and the supervision electronic card 120, and a second box 51 which is assembled with the first box 50 and which houses at least the AC connectors 52 and the DC connectors 110.

The inverter 100 according to the present invention advantageously further comprises a cellular card 1 which is adapted to provide a communication with a network 20 of a mobile network operator.

A mobile network operator, also known as a wireless service provider, wireless carrier, cellular company, or mobile network carrier, is a provider of services wireless communications that owns or controls all the elements necessary to sell and deliver services to an end user. Among these elements there is radio spectrum allocation, which the network operator owns or controls, for example through a license from a regulatory or government entity.

One or more devices 200 external to the inverter 100 can be operatively connected to the mobile network 20. Such devices 200 can comprise any devices suitable to be connected to the network 20, for example mobile devices, phones, servers, host points, communication gates of customers, service operators, grid operators, et cetera, which can be used for various tasks among which control, diagnostic, monitoring, supervision, et cetera.

Preferably, the cellular card 1 is adapted to provide a communication with the mobile network 20 according to one or more of the followings mobile telecommunication technologies and standards: GSM (Global System for Mobile Communications), GPRS (General Packet Radio Service), EDGE (Enhanced Data rates for GSM Evolution), HDGE, UMTS (Universal Mobile Telecommunications System), HDSPA (High-Speed Downlink Packet Access), LTE (Long term evolution), 2.5G (second and a half Generation), 3G (3rd Generation) or 4G (4rd Generation).

The above list is not limiting, and any mobile telecommunication or standard can be used according to the present invention.

Figure 6:
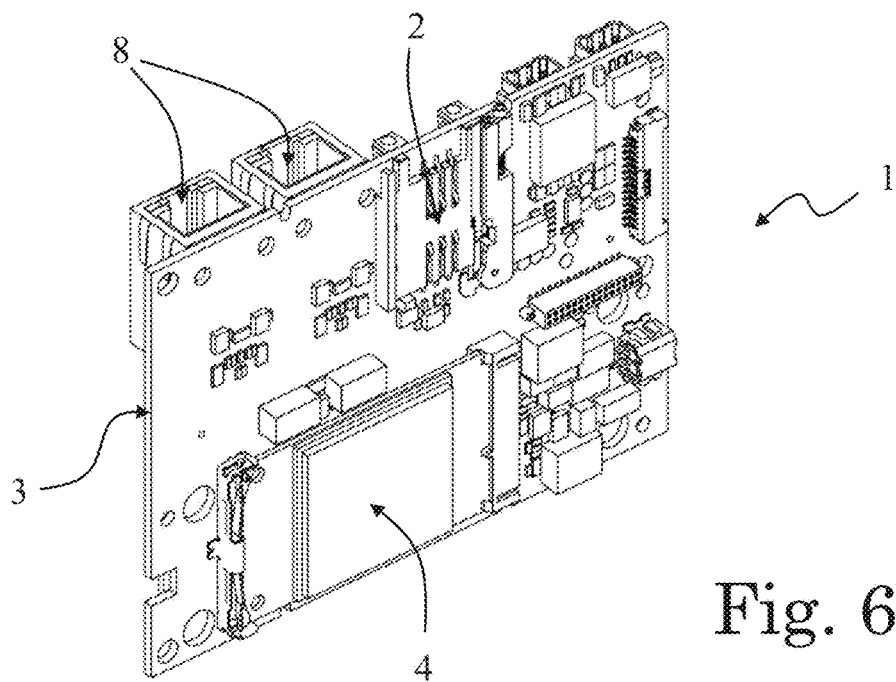
FIG. 6 is a rear view of a cellular card according to the present invention.

According to the exemplary embodiment illustrated in FIGS. 4 and 6, the cellular card 1 comprises a mounting board 3 on which several electronic or electric components and/or elements are mounted.

Among this components and/or elements there are at least a processing unit 7, such as a microprocessor, a DSP, or any other electronic unit with processing capabilities, and a modem module 4 which is operatively connected to the processing unit 7.

The processing unit 7 is adapted to control the operations of the modem module 4, in order to establish a connection with the mobile network 20 and to transmit/receive at least data to/from the network 20.

For example, the illustrated cellular card 1 comprises connectors 5 which are operatively connected to the modem module 4; the connectors 5 are adapted to be operatively connected to an antenna 6 of the inverter 100 (schematically illustrated in FIG. 1), for data radio transmission/reception.

Preferably, the cellular card 1 comprises a SIM (Subscriber Identity Module) card, i.e. a smart card having associated thereto an identifier. The identifier associates the cellular card 1 to a customer profile of the mobile network operator and, hence, to one or more telephone or data numbers. For example, a contract can be stipulated with the mobile network operator for exchanging at least data between the cellular card 1 and the mobile network 20 of the operator. The SIM card is operatively connected at least to the modem module 4. In the exemplary embodiment illustrated in FIG. 4, the SIM can be placed into a SIM cardholder 2 on the mounting board 3.

Preferably, the cellular card 1 is adapted to exchange text messages (SMS) with the external devices 200 through the mobile network 20. This is a practical way for an operator to send requests, commands or settings to the inverter 100, just by sending messages to the mobile phone number associated to the SIM card of the cellular card 1.

Preferably, the cellular card 1 is adapted to provide further communication capabilities in addition to the communication capability with the mobile network 20.

For example, the cellular card 1 is further adapted to provide a communication towards a LAN (Local Area Network) network, especially a Wi-Fi network 21 and/or an Ethernet network 22.

Devices 201 and 202 external to the inverter 100 can be operatively connected to the Wi-Fi network 20 and to the Ethernet network 22, respectively, for example for control, diagnostic, monitoring or supervision tasks.

The devices 201 can comprise any device suitable to be connected to the Wi-Fi network 21, for example mobile devices, Wi-Fi routers (e.g. in residential applications), any computer or notebook, other inverters, et cetera.

The devices 202 can comprise any device suitable to be connected to the Ethernet network 22.

For example, the processing unit 7 of the cellular card 1 illustrated in FIG. 4 is operatively connected to Ethernet connectors 8 and to a Wi-Fi connector 9 which are mounted on the board 3. The processing unit 7 is further adapted to transmit and receive data to/from the Wi-Fi network 21 and the Ethernet network 22 through the respective connectors 8 and 9.

For example, the Wi-Fi connector 9 can be operatively connected to a Wi-Fi antenna 10 of the inverter 100 (schematically illustrated in FIG. 1), for Wi-Fi data transmission and reception. The connectors 8 are adapted to be connected with cables or wires for exchanging data with the Ethernet network 22.

The inverter 100 according to the present invention further comprises at least one meter 140 which is operatively connected to the cellular card 1. For example, the meter 140 can be a high quality energy meter 140, for instance of the 0.5% class or a higher quality class.

Preferably, the meter 140 is adapted to output measurements related at least to parameters of the AC output generated by the inverter 100, namely by its power conversion means 110; among the various AC parameters measurable by the meter 140 there are for example voltage, current, power and energy.

Preferably, the cellular card 1 is housed into a box 300 (hereinafter indicated as "cellular box 300") which, in turn, is installed into the inverter 100.

More preferably, the box 300 also houses the meter 140 operatively connected to the cellular card 1.

In the exemplary embodiment illustrated in FIG. 4, the meter 140 comprises an electronic card 141 (hereinafter indicated as "meter card 141") which is overlapped to the cellular 1 housed in the same box 300.

In particular, the exemplary illustrated box 300 comprises a first shell 301 and a second shell 301 which can be mechanically coupled to each other, wherein the overlapped cards 1, 141 are disposed into the internal volume defined by coupling the shells 301, 302.

Figure 5:
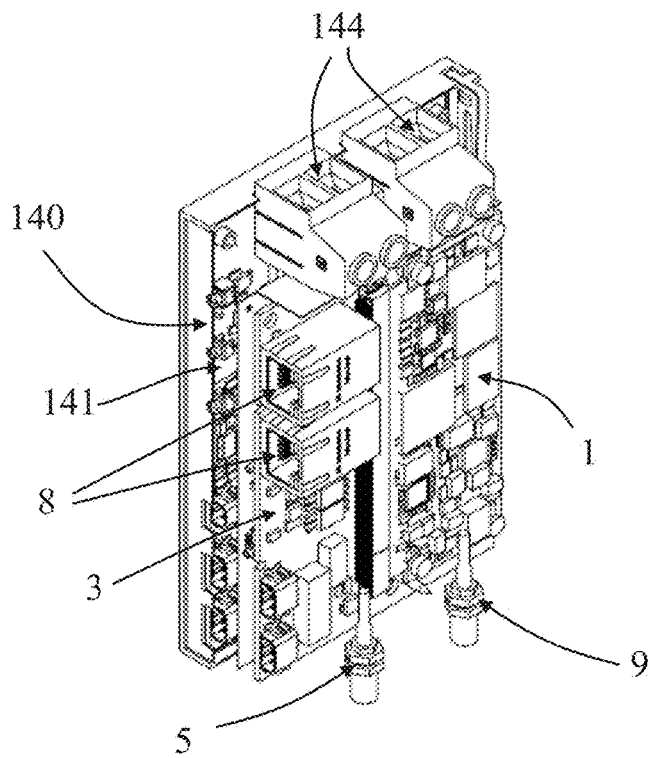
FIG. 5 illustrates an assembly of two electronic cards housed into the cellular box of FIG. 3.

The exemplary meter card 141 illustrated in FIGS. 4-5 comprises a mounting board 142 on which several electronic or electric components and/or elements are mounted. Among these components and/or elements there is at least a processing unit 143, such as a microprocessor, a DSP, or any other electronic unit with processing capabilities, which is adapted to control the executions of the meter functionalities.

The meter card 141 further comprises input and output data connectors 144 which are mounted on the board 142 and which are operatively connected to the processing unit 143.

The processing unit 143 is further operatively connected to the processing unit 7 of the cellular card 1, in such a way that the cellular card 1 can make available to the mobile network 20 the measurements of the meter 140 or data received by the meter 140 through input connector 144.

For example, the cellular card 1 can comprise data logger or memory means which are adapted to receive and store therein the measurements received from the processing unit 143. The processing unit 7 is adapted to retrieve these stored measurements and send them to the network 20.

Preferably, the processing unit 7 itself comprises the data logger or memory means.

According to the exemplary embodiment illustrated in FIG. 3, the cellular card 1 and the meter card 141 are preferably advantageously configured and overlapped in such a way that:
- the connectors 5, 8 and 9 of the cellular card 1 are accessible from sides 303 and 305, respectively, of the cellular box 300; and
- the connectors 144 of the meter card 141 are accessible from a side 304 of the cellular box 300, different to sides 303 and 305.

In this way, an operator can easier distinguish the connectors 144 of the meter 140 from the connectors 5, 8 and 9 of the cellular card 1.

In the exemplary embodiment illustrated in FIGS. 1 and 2, the cellular box 300 is housed into the second box 51 of the inverter 100. Preferably, the box 300 is operatively mounted on a metallic retention into the second box 51; such metallic retention can be advantageously a DIN rail.

Preferably, the cellular card 1 and the supervision card 120 of the inverter 100 are operatively connected for communicating to each other. For example, the supervision card 120 is operatively connected to the cellular card 1, e.g. to the processing unit 7 of the card 1, through serial communication wiring or cables 350.

The supervision card 120 can also be connected to the cellular card 1 for providing thereto the power supply suitable for the operation of its electric or electronic components and/or elements, such as the processing unit 7 and the modem module 4.

More preferably, the supervision card 120 can also provide, through the cellular card 1, the power supply suitable for the operation of the electronic or electric components and/or elements of the meter 140, such as the processing unit 143.

In practice, the above disclosed cellular card 1 is suitable for acting as a communication gateway for the meter 140 and for the supervision means 120 of the inverter 100 towards the mobile network 20 and, hence, towards the external devices 200 connected to the network 20.

For example, the cellular card 1 is adapted to retrieve the measurements of the meter 140 and to transmit them to the mobile network 20, for being available to the external devices 200.

With reference to the exemplary embodiments illustrated in the attached figures, the processing means 7 of the cellular card 1 can be configured for retrieving the measurements acquired by the processing unit 143 and for transmitting them, through the modem module 4 and related connectors 5 and antenna 6, towards the mobile network 20.

Further, the cellular card 1 can transmit the retrieved measurements of the meter 140 to the supervision card 120.

With reference to the exemplary embodiments illustrated in the attached figures, the processing means 7 of the cellular card 1 can be configured for transmitting the retrieved measurements to the supervision means 120 through the serial communication wiring or cables 350.

In this way, the measurements of the meter 140 can be available, in addition to the external devises 200, to the supervision card 120 or other internal units or elements of the inverter 100 operatively connected to the supervision card 120 itself. For example, the measurements of the meter 140 can be shown on a display of the inverter 100, through a display electronic board 130 connected to the supervision card 120.

For example, the cellular card 1 can be adapted to receive from the supervision card 120 measurements, status, alarms and other parameters or data related to the operation of the inverter 100, and to transmit them to the mobile network 20 and, hence, to the external devices 200 connected to the network 20.

With reference to the exemplary embodiments illustrated in the attached figures, the processing means 7 of the cellular card 1 can be configured for receiving, through the serial communication means 350, the data from the supervision card 120 and for transmitting them, through the modem module 4 and associated connectors 5 and antenna 6, towards the mobile network 20.

Further, the cellular card 1 can be adapted to receive from the external devices 200, through the mobile network 20, commands or requests and send them to the supervision card 120. For example, these commands or requests can be sent in the form of SMS.

With reference to the exemplary embodiments illustrated in the attached figures, the modem module 4 can be configured for receiving, through the antenna 6 and connector 5, the commands or requests sent from the external devices 200. The processing unit 7 can be adapted to send the received commands or requests, through the serial communication means 350, to the supervision card 120 or to the meter 140 for the execution thereof.

For example, the inverter 100 can comprises further measurement means 111, in addition to the meter 140, which are adapted to measure parameters related to the operation of the inverter 100 itself, and the supervision card 120 can be adapted to collect these further measurements.

In this case, the cellular card 1 can be adapted to retrieve the measurements of the further measurement means 111 from the supervision card 120 and to transmit them towards the mobile network 20, for being available to the external devices 200.

With reference to the exemplary embodiments illustrated in the attached figures, the processing unit 7 of the cellular card 1 can be configured for retrieving, through the serial communication means 350, the measurements collected in the supervision card 120. The processing unit 7 can be further configure for sending such retrieved measurements to the modem module 4 for the transmission, through the connector 5 and antenna 6, towards the mobile network 20.

The cellular card 1 can also be adapted to put in operative communication the meter 140 and the supervision card 120 connected thereto.

For example, the measurements of the meter 140 can be used by the supervision card 120 to update statistics related to the energy or power produced by the inverter 100 in a more precise way than the supervisor card 120 can perform basing only to the measurements from the measurement devices 111.

Preferably, the cellular card 1 is adapted to receive, through the network 20, upgrading software for the meter 140, and to upgrade the meter 140 using such received software.

With reference to the exemplary embodiments illustrated in the attached figures, the modem module 4 can be configured for receiving, through the connector 5 and antenna 6, the upgrading meter-software from the network 20. The processing unit 7 can be configured for retrieving from the modem module 4 such software and load it into the processing unit 143 of the meter card 141.

Preferably, the cellular card 1 is adapted to receive, through the network 20, upgrading software for the supervision card 120, and to upgrade the supervision card 120 using such received software.

With reference to the exemplary embodiments illustrated in the attached figures, the modem module 4 can be configured for receiving, through the connector 5 and antenna 6, the upgrading software for the supervision card 120 from the network 20. The processing unit 7 can be configured for retrieving from the modem module 4 such software and load it into the supervision card 120, e.g. into its control circuit.

Preferably, the cellular card 1 is adapted to receive, through the network 20, upgrading software for itself, and to upgrade itself using such software.

With reference to the exemplary embodiments illustrated in the attached figures, the modem module 4 can be configured for receiving, through the connector 5 and antenna 6, the upgrading software for the cellular card 1. The processing unit 7 can be configured for retrieving from the modem module 4 such software and load it therein.

In practice, it has been found that the inverter 100 according to the present disclosure fully meets the desired aim since it provides a solution capable of suitably putting the meter 140 and other internal components of the inverter 100, such as the supervision card 120, in operative communication with the network 20 of a mobile operator.

Since the network 20 has generally a broad coverage on a country territory, the inverter 100 can communicate with one or more external devices 200 connected to the network 20 in an effective way, even if the installation site thereof is in an isolated place.

The inverter 100 thus conceived and related renewable energy power generable installation are also susceptible of modifications and variations, all of which are within the scope of the inventive concept as defined in particular by the appended claims.

For example, even if the exemplary meter card 141 illustrated in FIG. 3 comprises an its own processing unit 143 operatively connected to the processing unit 7 of the cellular card 1, the processing unit 7 itself can be configured for carrying out the meter functionalities implemented by the processing unit 143 in addition to the functionalities of the cellular card 1.

Further, any possible combination of the previously disclosed embodiments, taken as whole or in part, can be implemented and has to be considered within the inventive concept of the present disclosure.

All the details may furthermore be replaced with technically equivalent elements and any of the previously described components may be differently shaped, or used in a different number of parts or elements, or the components previously described can be differently connected with respect to each other, provided they are suitable for the scope they are devised for.

Also the materials used, so long as they are compatible with the specific use and purpose, as well as the dimensions, may be any according to the requirements and the state of the art.

The invention claimed is:

1. An inverter for renewable energy applications, comprising:
a first box housing at least power conversion electronic means and a supervision card operatively associated to said power conversion electronic means;
a second box assembled with said first box, the second box housing a cellular box;
wherein said cellular box houses a meter and a cellular card;
said cellular card being operatively connected to said meter and being adapted to provide a communication with a network of a mobile network operator;
said cellular card and said supervision card being operatively connected for communicating each other;
said meter comprising an electronic card which is overlapped to said cellular card in the cellular box; and
said cellular card comprising first connectors for exchanging data and said electronic card of the meter comprising second connectors for exchanging data, and wherein said cellular card and said electronic card of the meter are configured and overlapped to each other in such a way that said first connectors and said second connectors are accessible from different sides of the cellular box.

2. The inverter according to claim 1, wherein said cellular card is adapted to provide a communication with said network according to at least one of a GPRS, an EDGE, a HDGE, a UMTS, a HDSPA, a LTE, a 2.5G, a 3G, a 4G and a GSM mobile telecommunication technology.

3. The inverter according to claim 1, wherein said cellular card comprises a SIM card.

4. The inverter according to claim 1, wherein said cellular card is adapted to exchange text messages (SMS) through said network.

5. The inverter according to claim 1, further comprising a Wi-Fi connector, wherein said cellular card is operatively connected to the Wi-Fi connector to provide a communication towards a Wi-Fi network.

6. The inverter according to claim 1, further comprising an Ethernet connector, wherein said cellular card is operatively connected to the Ethernet connector to provide a communication towards an Ethernet network.

7. The inverter according to claim 1, wherein said cellular card is adapted to receive, through said network, upgrading software for the meter and to upgrade the meter using the received upgrading software.

8. An apparatus comprising:
a renewable energy power generation installation; and
a inverter, comprising:
a first box housing at least power conversion electronic means and a supervision card operatively associated to said power conversion electronic means;
a second box assembled with said first box, the second box housing a cellular box;
wherein said cellular box houses a meter and a cellular card;
said cellular card being operatively connected to said meter and being adapted to provide a communication with a network of a mobile network operator;
said cellular card and said supervision card being operatively connected for communicating each other;

said meter comprising an electronic card which is overlapped to said cellular card in the cellular box; and said cellular card comprising first connectors for exchanging data and said electronic card of the meter comprising second connectors for exchanging data, and wherein said cellular card and said electronic card of the meter are configured and overlapped to each other in such a way that said first connectors and said second connectors are accessible from different sides of the cellular box.

* * * * *